J. M. AND J. A. DIRIENZO.
INNER TUBE.
APPLICATION FILED MAR. 22, 1919.
1,339,948.
Patented May 11, 1920.
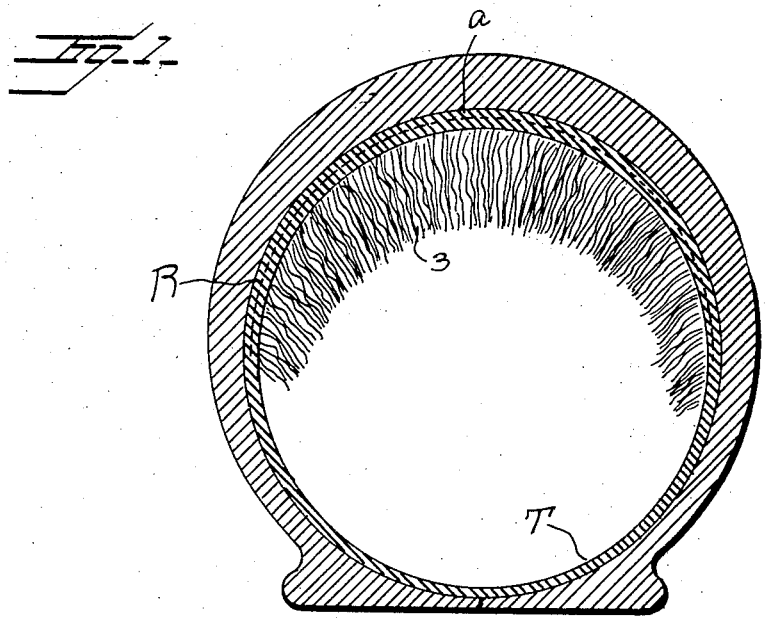
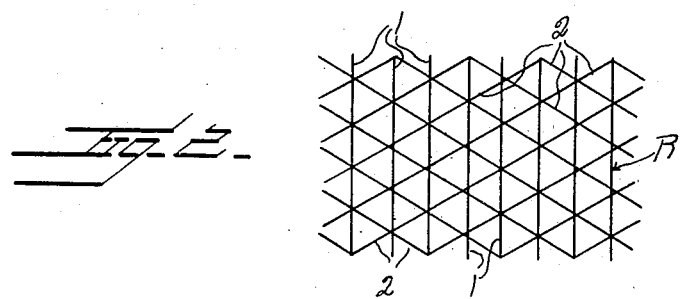
Inventors
J. M. Dirienzo
J. A. Dirienzo
By Watson E. Coleman
Attorney

UNITED STATES PATENT OFFICE.

JOSEPH M. DIRIENZO AND JOHN A. DIRIENZO, OF MADISON, WISCONSIN.

INNER TUBE.

1,339,948.     Specification of Letters Patent.     Patented May 11, 1920.

Application filed March 22, 1919. Serial No. 284,276.

*To all whom it may concern:*

Be it known that we, JOSEPH M. DIRIENZO and JOHN A. DIRIENZO, citizens of the United States, residing at Madison, in the county of Dane and State of Wisconsin, have invented certain new and useful Improvements in Inner Tubes, of which the following is a specification, reference being had to the accompanying drawings.

This invention relates to certain improvements in inner tubes for pneumatic tires and the like, and it is an object of the invention to provide a device of this general character having novel and improved means whereby a puncture, when the tube is under inflation, is automatically closed or sealed.

The invention consists in the details of construction and in the combination and arrangement of the several parts of our improved inner tube whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in cross section of an inner tube constructed in accordance with an embodiment of our invention, and in applied position, and Fig. 2 is a fragmentary view in plan illustrating in detail the reinforcement embedded within the tread portion of our improved tube.

As disclosed in the accompanying drawings, T denotes our improved inner tube formed of rubber or similar material and the wall of said tube at its outer or tread portion is of increased thickness, as indicated at *a*, and embodied within said outer or tread portion of the tire T and extending entirely therearound in a circumferential direction is a reinforcement R whereby said portion of the tire is held against stretch except a slight circumferential expansion. The wall at the inner portion of the tire is capable of sufficient stretch to cause the tube, when under inflation, to properly seat within the casing C.

The reinforcement R, as herein embodied, comprises a series of circumferentially spaced and transversely directed cords or strands 1 extending across the outer or tread portion of the tire, together with the reversely disposed and obliquely directed cords or strands 2. The cords or strands 1 and 2 effectively hold the outer or tread portion of the tube T against lateral expansion with the portions of the tube between the strands, when the tube is inflated, under compression, but in the event the tube is punctured, when under inflation, the pressure upon the tube together with the expansion of the portion of the tube through which the puncture is effected will result in sealing the puncture.

It is to be understood that the outer or tread portion of the tube T, or more particularly the portions between the cords or strands 1 and 2 are compressed by the pressure of the air within the tube when inflated, and by contact of the tube with the casing of the tire.

We also find it of advantage and importance to employ the elongated threads 3, preferably formed of rubber or like material, and each of said threads is secured at one end to the inner face of the outer or tread portion *a*. These threads are arranged in close proximity one to the other and when the tube T, when inflated, is punctured, the pressure within the tube will cause certain of said threads to be forced outwardly through the puncture and thereby serve to effectually close or seal such puncture. The reinforcement R, as hereinbefore described, serves to assure the maintenance of said threads within the puncture and to further facilitate the closing or sealing of the puncture.

It is also to be understood that the reinforcement R operates to substantially reduce the possibility of a blowout.

From the foregoing description, it is thought to be obvious that an inner tube constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. As a new article of manufacture, an inner tube and a plurality of threads engaged with the tread portion of the tire and free one from the other, each of said threads being secured at an end to the tube.

2. As a new article of manufacture, an inner tube and a plurality of threads engaged with the tread portion of the tire and free one from the other, each of said threads being secured at an end to the tube, and a reinforcement arranged within the tread portion of the tube.

3. As a new article of manufacture, an inner tube and a reinforcement embodied within said inner tube, said reinforcement comprising circumferentially spaced and transversely disposed strands, and reversely directed and obliquely disposed strands, said transversely disposed strands crossing the obliquely disposed strands at substantially the crossing points of said obliquely disposed strands.

In testimony whereof we hereunto affix our signatures in the presence of two witnesses.

JOSEPH M. DIRIENZO.
JOHN A. DIRIENZO.

Witnesses:
JACOB P. KOLB,
Mrs. F. M. RYAN.